3,041,142
REFRACTORY BORIDE AND SILICIDE SHAPES
AND METHOD OF MAKING
Roland V. Van Der Beck, Grand Island, and Kenneth M. Taylor, Lewiston, N.Y., assignors to The Carborundum Company, Niagara Falls, N.Y., a corporation of Delaware
No Drawing. Filed May 29, 1953, Ser. No. 358,566
6 Claims. (Cl. 23—204)

This invention relates to a method of making shaped articles of manufacture composed of substantially a single self-bonded crystalline compound developed in situ from a mixture of ingredients containing the elemental components of said crystalline compound. More particularly, it relates to a process for obtaining bodies of the described type by subjecting the raw materials mixture to heat and pressure while contained in a mold whereby the ingredients are not only reacted but also the resulting solid reaction product is compacted to the desired shape and density in the same operation. The process applies to those materials which undergo dry-state reactions and include, inter alia, self-bonded metal boride bodies such as titanium, zirconium and molybdenum borides, and metal silicide bodies such as the molybdenum silicides. The invention further relates to the improved articles or bodies obtained by such methods.

The standard or conventional practice heretofore followed in the making of self-bonded inorganic crystalline bodies of the described type has involved the following operations or steps:

(1) The raw materials are reacted at high temperatures to form the desired crystalline end product;
(2) The resulting product of the reaction is crushed to coarsely granular condition;
(3) The crushed granular material is further comminuted by milling to reduce the particle size to a fine condition;
(4) The resulting finely divided material is subjected to an acid treatment to remove the iron contamination resulting from steps 2 and 3; and finally,
(5) The resulting acid-treated finely divided material is hot-pressed at high temperatures and pressures to compact it to the desired size and shape.

It is an object of the present invention to provide an improved and more efficient method of making such self-bonded inorganic crystalline bodies or articles of manufacture.

It is a further object ot provide a method of making such bodies which will eliminate the need for crushing, milling and acid treating operations.

It is a still further object to provide a novel and improved method of making self-bonded metal boride and silicide articles of manufacture.

It is a further object to provide self-bonded inorganic crystalline bodies of the described type having improved density and resistance to chemicallly destructive conditions.

Other objects and advantages accruing from the present invention will become apparent as the description proceeds.

In accordance with the present invention shaped articles are made of an inorganic crystalline material compacted to the desired density and self-bonded by means of its own crystalline growth and development without the need for extraneous bonding constituents. The shaped articles are made directly from the raw materials which are placed in a suitable mold and subjected to sufficient heat and pressure to react the raw materials and form the ultimate solid crystalline material. The crystalline material in the same operation is compacted to the desired density to form a dense strong body of the desired shape. For example, titanium boride is formed according to the following equation:

$$2TiO_2 + B_4C + 3C \rightarrow 2TiB_2 + 4CO\uparrow$$

In making titanium boride articles according to the present invention and following the above reaction the titanium oxide, boron carbide and carbon raw materials which are to be reacted to form the desired titanium boride are placed in a graphite mold, preferably in approximately the stoichiometric proportions required by the above equation, and are subjected to simultaneous heat and pressure to bring about the reaction of the ingredients to form titanium boride and carbon monoxide, the carbon monoxide passing off as a gas. As the materials are reacted, the perssure exerted upon the mold contents brings about a compaction of the titanium boride which has been formed in the mold. The pressure applied during the compacting stage of the operation can be greater than the pressure applied during the earlier stages of the operation when the reaction is taking place. Although the maximum pressure can be applied during the entire operation, the usual practice is to apply little or no pressure upon the mold contents beyond the pressure exerted by the mold plunger until after the reaction stage of the operation has been at least partially completed whereupon the ultimate compacting pressures are applied. The temperature and pressure are maintained upon the mold contents until the downward movement of the mold plunger ceases and no further compaction of the mold contents is apparent, whereupon the pressure is released and the mold is allowed to cool. The resulting self-bonded titanium boride body is obtained in the desired shape ready for use.

Self-bonded articles can be similarly made by reacting the necessary ingredients to obtain zirconium boride, molybdenum boride, bolybdenum silicides or other similar inorganic crystalline materials, the raw materials of which will undergo dry-state reactions. Self-bonded articles can be similarly made which are composed of a single complex crystalline compound such as a zirconium-titanium boride body wherein the article is obtained by reacting in the mold a mixture of titanium oxide and zirconium oxide with boron carbide and carbon to form a crystalline zirconium-titanium boride.

It has sometimes been found that in carrying out the above reaction to form self-bonded titanium boride bodies directly from the raw materials that bulkiness of the raw materials for the reaction requires excessive initial mold capacity. The above and similar reactions can be modified in respect of the raw ingredients so as to require much less initial mold capacity by a slight change in the raw materials used in accord with the following reaction:

$$3Ti + TiO_2 + 2B_4C \rightarrow 4TiB_2 + 2CO\uparrow$$

Similarly, zirconium boride can be obtained in self-bonded article form by means of the following reaction:

$$3Zr + 1ZrO_2 + 2B_4C \rightarrow 4ZrB_2 + 2CO\uparrow$$

The metal borides, such as titanium boride or zirconium boride can also be made by a modification of the latter type of reactions using the respective metal as one of the raw batch ingredients, but offering the advantage of requiring less of the metal which is relatively expensive, by preparing the raw batch mixture in the proportions required by the following type of reaction, in which R is the metallic component, e.g., titanium or zirconium.

$$3RO_2 + 2B_4C + 4C + R \rightarrow 4RB_2 + 6CO\uparrow$$

The following specific examples are illustrative of the manner in which the present process can be carried out.

Example I

Small shaped articles composed of self-bonded titanium boride have been made as follows:

| | Percent by weight |
|---|---|
| Titanium oxide (200 mesh and finer) | 65.3 |
| Boron carbide (325 mesh and finer) | 22.4 |
| Carbon | 12.3 |

The above mixture of titanium oxide, boron carbide and carbon was blended and intimately mixed by tumbling and passing the tumbled material through a 200-mesh screen. The mixture was then moistened with a little water, placed in a graphite mold and after drying, the mold was placed in an Ajax induction furnace and heated to 2100° C. After approximately 1 hour the reaction of the ingredients was assumed to have reached completion and pressure was gradually applied to a maximum of 1500 pounds per square inch. The pressure was maintained until further depression of the plunger had ceased. Evolution of gas from the mold began below 1500° C. but became more noticeable at around 1700° C., although the exact temperature at which such evolution takes place depends somewhat upon the rate of heating. The evolution of the gas is primarily the result of the reaction between the ingredients according to the following equation:

$$2TiO_2 + B_4C + 3C \rightarrow TiB_2 + 4CO\uparrow$$

It is to be noted that the above proportions of titanium dioxide, boron carbide and carbon approach but are not exactly in accord with the stoichiometric proportions required by the above equation, the slight departure from stoichiometric proportions being the result of taking into consideration the presence of minor amounts of impurities in the boron carbide. After the mold contents have been held at the maximum temperature and pressure for a sufficient length of time to permit the reaction to be completed and compaction to the desired density to take place, the pressure is released and the mold allowed to cool.

The resulting hot pressed self-bonded titanium boride shapes, using conventional methods for determination of specific gravities, had specific gravities of around 4.60 and even higher. These high specific gravity figures, as actually determined on a number of the shapes made by the present process, are sometimes slightly higher than the specific gravity of 4.52 given for pure titanium boride in the handbooks. This apparent discrepancy can be explained by the possible presence in the bodies as made of a slight amount of extraneous material as, for example, small amounts of iron which are however not present in sufficient amount to materially affect the properties of the titanium boride body. Microscopic examination showed that the crystals of titanium boride were large and well-developed. The exact size and development of crystals within the body of the article varies with the size and shape of piece made as well as with the length of time the article is maintained at the upper temperatures and pressures in the mold. Generally speaking, as the mold time at high temperature and pressure is increased the size of the crystals becomes greater.

Cylindrical test specimens molded in accordance with the above procedure and measuring ¾" in diameter and approximately ½" in length when exposed to an oxidation test underwent a surface gain in weight of .008 gram per square centimeter of surface, amounting to a gain in weight of .65%. Similarly shaped bodies composed of self-bonded titanium boride made in accordance with prior art practice of hot pressing previously prepared titanium boride powders, when hot pressed under similar pressures and temperatures, had appreciably lower specific gravities under actual measurement by the same methods and when subjected to the same oxidation test underwent a gain in weight in the order of .084 gram per square centimeter of surface or 2.07% gain in weight due to oxidation. Furthermore, the bodies made in accordance with the above description were usually found to have a larger and more fully developed crystalline structure than similar bodies made by hot pressing previously prepared titanium boride powders depending upon the length of time the piece is held in the mold under high temperature and pressure.

Example II

Self-bonded titanium boride bodies similar in properties to those made according to Example I above have been made as follows:

| | Percent by weight |
|---|---|
| Titanium metal (200 mesh and finer) | 43 |
| Titanium oxide (200 mesh and finer) | 24 |
| Boron carbide (325 mesh and finer) | 33 |

The above mixture is prepared and processed in the manner described for Example I whereupon the mold contents are reacted according to the following equation and the solid titanium boride reaction product compacted to the desired shape. The making of self-bonded titanium boride bodies according to this modification offers the advantage over the specific method of Example I that the raw materials mixture requires less initial mold capacity, an advantage which is particularly pronounced in the making of larger shapes.

$$3Ti + TiO_2 + 2B_4C \rightarrow 4TiB_2 + 2CO\uparrow$$

Example III

Self-bonded zirconium boride shaped articles and test specimens have been made from the following mixture:

| | Percent by weight |
|---|---|
| Zirconium oxide (200 mesh) | 74.0 |
| Boron carbide (325 mesh) | 16.8 |
| Carbon | 9.2 |

The above proportions depart slightly from the stoichiometric proportions of 73 parts by weight zirconium oxide, 16.4 parts by weight boron carbide and 10.6 parts by weight carbon in order to take into consideration the minor impurities contained in the boron carbide. No allowance for volatilization is required. The procedure followed in preparing the mixture and forming the article are essentially the same as those set forth for Example I above. A maximum compacting pressure of 2,000 pounds per square inch and a maximum temperature of 2000° C. was maintained, the maximum temperature being held for a period of 15 minutes.

The resulting molded pieces had a specific gravity of around 5.68. Microscopic examination of polished zirconium boride specimens revealed that the pieces were composed substantially entirely of self-bonded zirconium boride crystalline material.

Example IV

Self-bonded zirconium boride shaped articles and test specimens have been made from the following mixture:

| | Percent by weight |
|---|---|
| Zirconium oxide (200 mesh) | 59.65 |
| Boron carbide (325 mesh) | 17.85 |
| Zirconium metal (200 mesh) | 14.75 |
| Carbon | 7.75 |

The above mixture is prepared and processed in the manner described for Example III whereupon the mold contents are reacted according to the following equation and the solid zirconium boride reaction product compacted to the desired shape. The making of zirconium boride bodies according to this modification offers the advantage of reducing to some extent the amount of zirconium oxide required for the operation, and consequently the amount of initial mold capacity without requiring an excessive amount of the more expensive zirconium metal.

$$3ZrO_2 + 2B_4C + 4C + Zr \rightarrow 4ZrB_2 + 6CO\uparrow$$

Example V

The following mixture composed of raw materials modified by the inclusion of a minor amount of previously prepared titanium boride powder was used for the making of self-bonded titanium boride bodies. This modification wherein a certain percentage of previously prepared titanium boride is used in conjunction with the use of raw materials offers not only the advantage of permitting the use of lower temperatures and/or pressures than those required for obtaining bodies of the same composition and density but molded entirely from previously prepared titanium boride, but also offers the same advantage that Example II above has over Example I without requiring the use of titanium metal, namely, that the uncompacted mold contents occupy a smaller mold volume or capacity than a batch entirely of raw materials.

| | Percent by weight |
|---|---|
| Previously prepared titanium boride powder (200 mesh and finer) | 35.6 |
| Titanium oxide (200 mesh and finer) | 42.0 |
| Boron carbide (325 mesh and finer) | 14.5 |
| Carbon | 7.9 |

The above mixture was prepared and the article formed as in Example I above. In order to demonstrate the effect of the use of raw materials as a major part of the pressing mixture on the temperature required the mold was heated at only 1850° C. for 30 minutes whereas the customary temperature for forming similar shaped bodies of 100% previously formed titanium boride powder is around 2100° C.

The resulting body was of excellent quality with a specific gravity of about 4.56. The specific gravity of similar bodies made from 100% titanium boride previously prepared from the same reaction has never been known to be higher than 4.40, indicating an advantage of the present process for obtaining articles of high density.

Example VI

| | Percent by weight |
|---|---|
| Molybdenum oxide (MoO₃) | 71 |
| Boron carbide (325 mesh) | 14 |
| Carbon | 15 |

The above mixture of materials was processed in accordance with the procedure set forth in Example I above and in accordance with the following equation the ingredients reacted and were compacted to form a strong self-bonded molybdenum boride body:

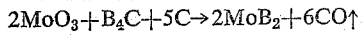

$$2MoO_3 + B_4C + 5C \rightarrow 2MoB_2 + 6CO\uparrow$$

While specific temperatures and pressures have been set forth above in connection with the various illustrative examples given for carrying out the present invention, it is to be clearly understood that the herein-described process can be followed using other temperatures and pressures without departing from the invention. Although not necessary, a flow of helium or other inert gas through the furnace chamber can be maintained to sweep out the carbon monoxide generated during the reaction and maintain a more accurate control over the conditions of the ambient atmosphere. The particular temperature and pressure used will depend upon the particular temperature and pressure limitations of the equipment available for use, and will also depend upon the particular compositions of the bodies to be formed. It is essential that the temperatures and pressures be sufficient to respectively bring about the reaction of the ingredients and the compaction of the resulting solid crystalline end product to the desired density. It is usually found that temperatures of around 1800° C. or above are adequate to bring about the reaction and pressures of 500 pounds per square inch or greater are needed for obtaining the desired density. It is also within the spirit of the present invention to maintain the pressure over the entire heating period although it has been found adequate to maintain maximum pressure only during that part of the operation in which compaction of the reacted material is being obtained.

It is further pointed out that although in the specific examples set forth above the raw materials have been used in approximately the stoichiometric proportions required by the intended chemical reaction between the raw materials of the raw mixture and such practice is to be preferred, it is recognized that the present invention can be practiced with one or more of the raw materials in excess of the amount required for the reaction in which case the final product may contain minor amounts of a secondary material but in insufficient quantity to be controlling of the physical properties of the final product. For example, an excess of boron carbide would result in the presence of some boron carbide in the final product, or an excess of the metal oxide would result in some residual oxide in the final product to an extent which could be tolerated without detracting substantially from the otherwise desirable properties of the product.

Wherever reference is made herein throughout the specification or claims to a "dry-state reaction" such expression is intended to mean a reaction which takes place while the reactants are in the solid state in contrast to reactions undertaken while the reactants are in a liquid condition or in a state of solution in a liquid medium.

Having described the invention in detail, it is desired to claim:

1. A method of making a self-bonded shaped article of manufacture composed of substantially a single self-bonded crystalline compound selected from the group consisting of titanium, zirconium and molybdenum borides and silicides, and having approximately the density of an article of the pure crystalline compound, which comprises preparing a mixture of raw materials that together will undergo a dry-state reaction to form the single crystalline compound from which the shaped article is to be made and, as well, carbon monoxide, and that includes in particulate form, an oxide of the metal of which the compound is to be formed, a carbide selected from the group consisting of boron and silicon, and a reducing agent selected from the group consisting of said metal in substantially pure state, carbon, and mixtures of said metal and carbon, placing said mixture in a mold, heating said mixture to its reaction temperature of at least 1800° C. to initiate said reaction, permitting said carbon monoxide to escape, compressing the mold contents under a pressure of at least 500 p.s.i. while maintaining said mold contents at a temperature at least as high as the reaction temperature to compact the resulting crystalline compound to a desired shape, and maintaining said shape at least at reaction temperature and under a pressure of at least 500 p.s.i. for an extended period of time of at least 15 minutes until no further compaction is apparent, to form a self-bonded article of the desired shape having approximately the density of an article of the pure crystalline compound.

2. A method of making a self-bonded shaped article of manufacture composed of substantially a single self-bonded crystalline compound selected from the group consisting of titanium, zirconium and molybdenum borides and silicides, and having approximately the density of an article of the pure crystalline compound, which comprises preparing a mixture of raw materials that together will undergo a dry-state reaction to form the single crystalline compound from which the shaped article is to be made and, as well carbon monoxide, and that includes in particulate form an oxide of the metal of which the compound is to be formed, a carbide selected from the group consisting of boron and silicon, and a reducing agent selected from the group consisting of said metal in substantially pure state, carbon, and mixtures of said metal and carbon, placing said mixture in a mold, heating said mixture in the mold to its reaction temperature of at least 1800° C. to initiate said reaction, permitting said carbon monoxide to escape, maintaining reaction temperature at least until said reaction has been partially completed and some evolution and escape of carbon monoxide has taken place, then compressing the mold contents under a pressure of at least 500 p.s.i. while maintaining the temperature at least at the reaction temperature, to compact the resulting crystalline compound to a desired shape, and maintaining said article in the mold at a temperature at least as high as reaction temperature and under a pressure of at least 500 p.s.i. for an extended period of time of at least 15 minutes until no further compaction is apparent to form a self-bonded article of the desired shape having approximately the density of an article of the pure crystalline compound.

3. A method of making a shaped, self-bonded metal boride body selected from the group consisting of titanium, zirconium and molybdenum, and having approximately the density of a body of the pure metal boride, which comprises preparing a homogeneous mixture comprising, in particulate form, an oxide of the metal of which the boride is to be formed, boron carbide, and a reducing agent selected from the group consisting of said metal in substantially pure state, carbon, and mixtures of said metal and the carbon, placing said homogeneous mixture in a mold, heating said mixture to a temperature of at least 1800° C. at which a dry state reaction is initiated between the components of said mixture to form the boride of said metal and carbon monoxide, permitting the evolved carbon monoxide to escape, compressing the contents of said mold under a pressure of at least 500 p.s.i. while heating said mold contents to a temperature at least as high as the reaction temperature to compact the resulting boride to the desired shape, and maintaining said shape in the mold at a temperature at least as high as the reaction temperature and under at least 500 p.s.i. pressure over an extended and substantial period of time of at least 15 minutes until no further compaction is apparent, to form a self-bonded metal boride body having the desired shape and having approximately the density of an article of the pure boride.

4. A method of making a shaped article of manufacture composed substantially of self-bonded titanium boride and having approximately the density of pure crystalline titanium boride which comprises preparing an intimate mixture comprising, in particulate form, titanium oxide, carbon, and boron carbide, in approximately the stoichiometric proportions required by the dry state reaction:

$$2TiO_2 + B_4C + 3C \rightarrow 2TiB_2 + 4CO\uparrow$$

placing said mixture in a mold, subjecting the mold contents to an elevated temperature of at least about 1800° C. to initiate said reaction, maintaining reaction temperature at least until said reaction has been partially completed, permitting the evolved carbon monoxide to escape, compressing said mold contents at a pressure of at least 500 p.s.i. while maintaining a temperature at least as high as the reaction temperature to compact the resulting titanium boride to the desired shape, and maintaining said shape in the mold at a temperature at least as high as the reaction temperature and under at least 500 p.s.i. over an extended and substantial period of time of at least 15 minutes until no further compaction is apparent, to form a self-bonded article of titanium boride having the desired shape and having approximately the density of an article of the pure crystalline boride.

5. A method of making a shaped article of manufacture composed substantially of self-bonded zirconium boride and having approximately the density of the pure crystalline boride which comprises preparing an intimate mixture comprising, in particulate form, zirconium oxide, carbon, and boron carbide, in approximately the stoichiometric proportions required by the dry state reaction:

$$2ZrO_2 + B_4C + 3C \rightarrow 2ZrB_2 + 4CO\uparrow$$

placing said mixture in a mold, subjecting the mold contents to an elevated temperature of at least about 1800° C. to initiate said reaction, maintaining reaction temperature at least until said reaction has been partially completed, permitting the evolved carbon monoxide to escape, compressing said mold contents at a pressure of at least 500 p.s.i. while maintaining the temperature at least as high as the reaction temperature to compact the resulting zirconium boride to the desired shape, and maintaining said shape in the mold at a temperature at least as high as the reaction temperature and under a pressure of at least 500 p.s.i. over an extended and substantial period of time of at least 15 minutes until no further compaction is apparent, to form a self-bonded article of zirconium boride having the desired shape and having approximately the density of an article made of the pure crystalline boride.

6. A method of making a self-bonded, shaped article of manufacture comprising a self-bonded metal boride selected from the group consisting of titanium and zirconium, and having approximately the density of an article of the pure, crystalline metal boride, which comprises preparing an intimate mixture comprising, in particulate form, an oxide of said metal, said metal, carbon, and boron carbide, in approximately the stoichiometric proportions required by the dry state reaction:

$$3MeO_2 + 2B_4C + 4C + Me \rightarrow 4MeB_2 + 6CO\uparrow$$

where Me represents said metal, placing said mixture in a mold, subjecting the mold contents to a temperature of at least 1800° C. to initiate said reaction, maintaining reaction temperature at least until said reaction has been partially completed, permitting the evolved carbon monoxide to escape, compressing said mold contents at a pressure of at least 500 p.s.i. while maintaining reaction temperature to compact the resulting metal boride to the desired shape, and then maintaining said shape in the mold at a temperature at least as high as the reaction temperature and under a pressure of at least 500 p.s.i. over an extended and substantial period of time of at least 15 minutes until no further compaction is apparent, to form a self-bonded article of the metal boride having the desired shape and having approximately the density of an article of the pure, crystalline boride.

References Cited in the file of this patent
UNITED STATES PATENTS

| | | |
|---|---|---|
| 869,114 | Tucker | Oct. 22, 1907 |
| 1,740,009 | Diener | Dec. 17, 1929 |
| 1,756,857 | Gilson | Apr. 29, 1930 |
| 1,858,413 | Noack et al. | May 17, 1932 |
| 1,895,364 | Billings | Jan. 24, 1933 |
| 2,059,041 | Schroter et al. | Oct. 27, 1936 |
| 2,073,826 | Balke | Mar. 16, 1937 |
| 2,089,030 | Krathy | Aug. 3, 1937 |

FOREIGN PATENTS

| | | |
|---|---|---|
| 295,547 | Germany | Nov. 29, 1916 |

OTHER REFERENCES

Gvetzel: "Treatise on Powder Metallurgy," 1949, vol. I, pages 423–424.

Glaser: "Journal of Metals," vol. 4, No. 4, pages 391–396 (April 1952).

Kieffer et al.: "Zeitschrift für Anorganische und Allgemaine Chemie," vol. 268, No. 3, pages 191–200 (May 1952).

Mellor: "Comprehensive Treatise on Inorganic and Theoretical Chemistry," 1925, vol. VI, page 191.